Sept. 7, 1943.   W. K. CROWDER   2,328,786
AIRCRAFT
Filed March 29, 1941   2 Sheets-Sheet 1
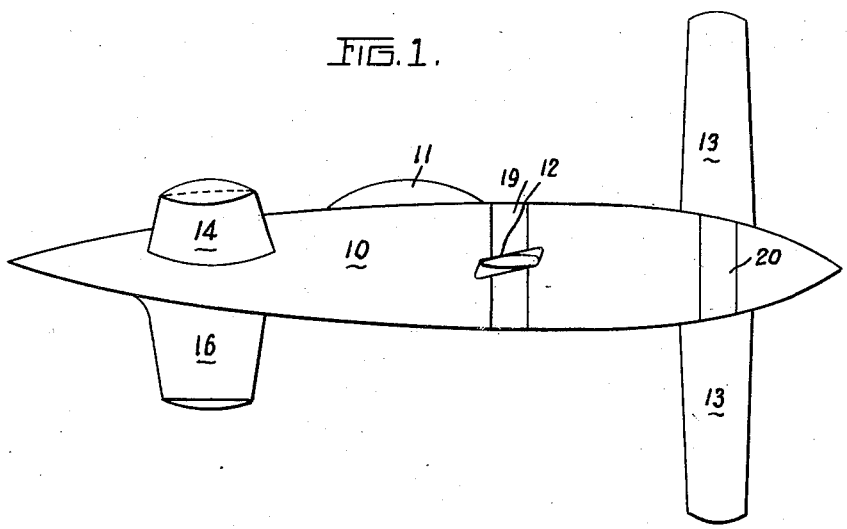
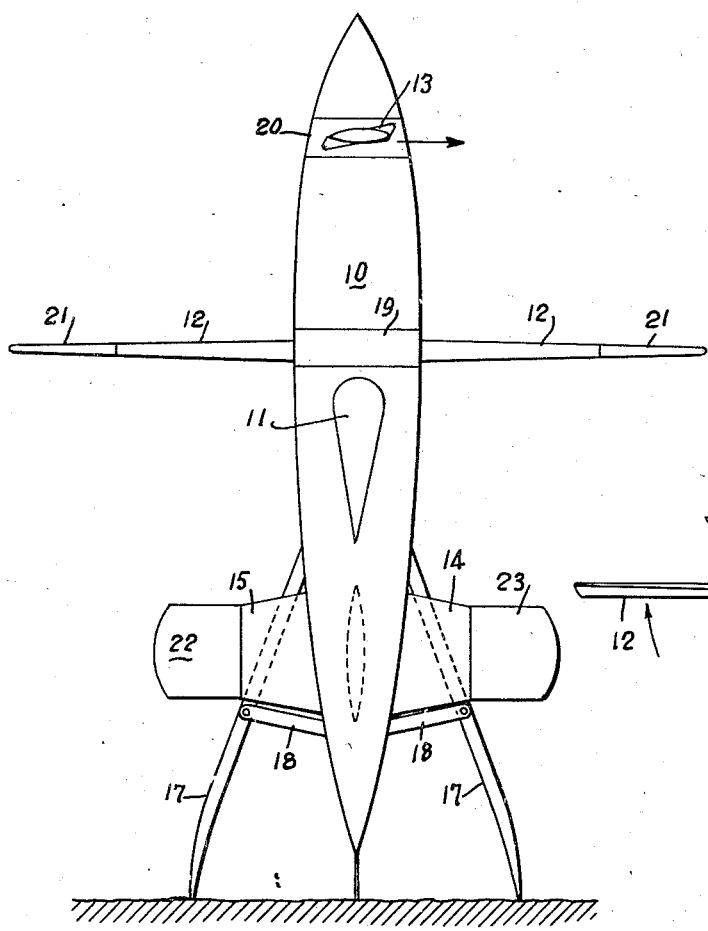
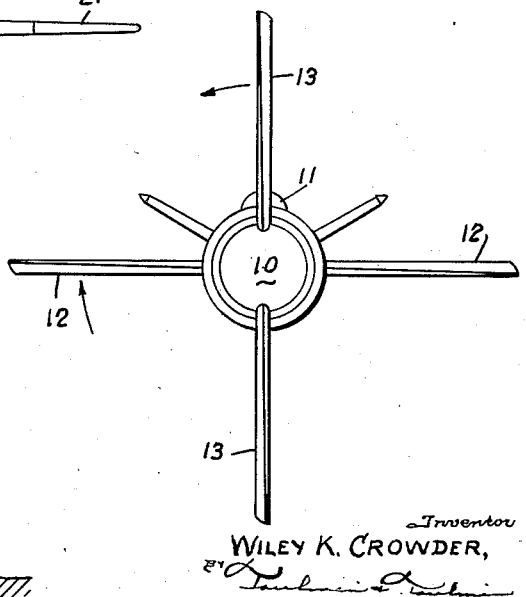
Inventor
WILEY K. CROWDER,
Attorney Sept. 7, 1943. W. K. CROWDER 2,328,786
AIRCRAFT
Filed March 29, 1941 2 Sheets-Sheet 2
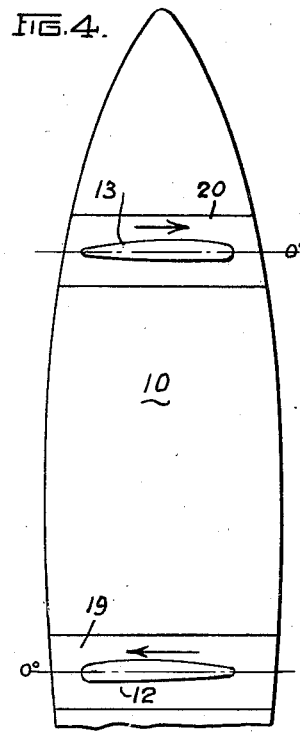
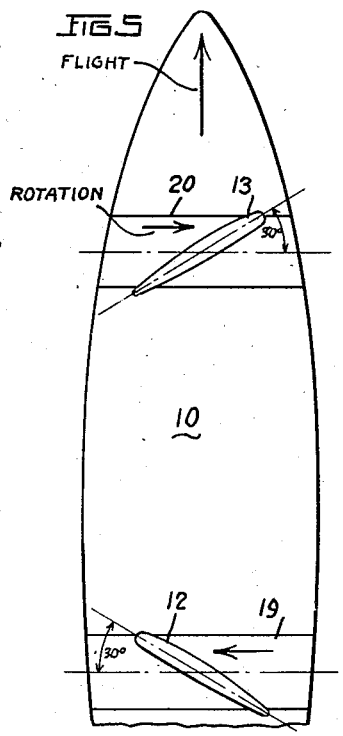
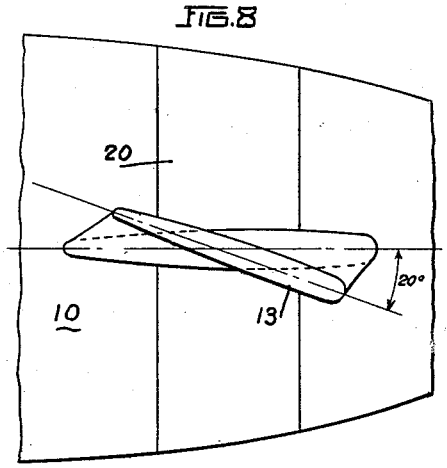
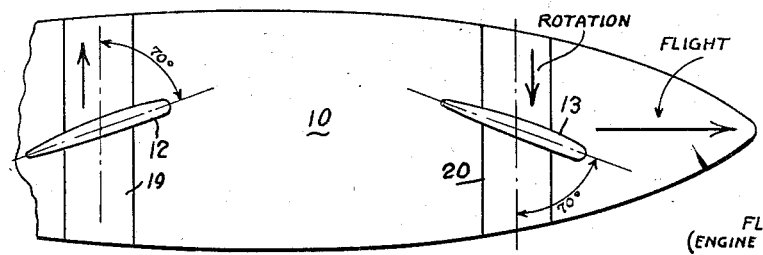
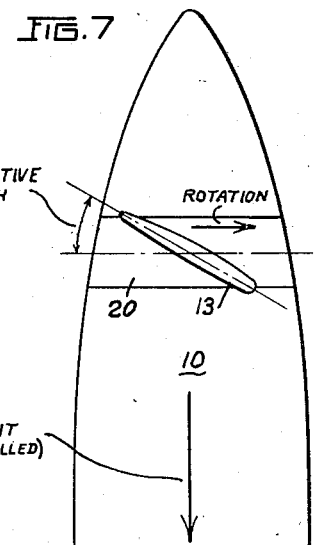
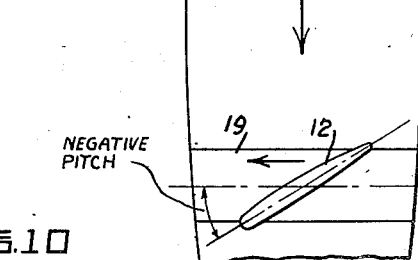
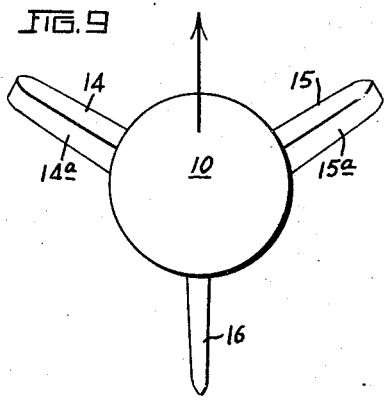
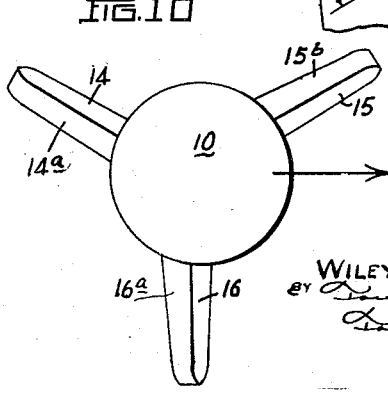
Inventor
WILEY K. CROWDER,
By
Attorneys Patented Sept. 7, 1943

2,328,786

UNITED STATES PATENT OFFICE 2,328,786

AIRCRAFT

Wiley K. Crowder, Detroit, Mich.

Application March 29, 1941, Serial No. 385,918

6 Claims. (Cl. 244—7)

This invention relates to an aircraft structure wherein the conventional wings are omitted and wherein a pair of rotating wing systems provides the power for lifting the craft from the ground as well as propelling the craft through the air.

Aircraft using rotating wing structure have heretofore maintained the wing structure in a substantially horizontal position for lifting the aircraft from the ground and have provided independent means for propelling the craft horizontally through the air. In this invention, however, a pair of rotating wing systems is provided for rotation upon a common axis which is parallel with the axis of the aircraft and retains this parallel relation whether lifting the craft from the ground or propelling the same through the air. When the aircraft is to be lifted from the ground the rotating wing systems are substantially horizontal with respect to the ground to obtain the maximum lifting effect, whereas when the aircraft attains altitude and is leveled off into the normal flight position the wing systems are then substantially vertical with respect the ground and act as propellers to cause forward motion of the craft while at the same time providing the lifting motion for retaining the craft in the air.

It is therefore an object of this invention to provide an aircraft with a pair of oppositely rotating wing structures which rotate upon an axis substantially parallel with the axis of the fuselage of the aircraft.

It is another object of the invention to provide an aircraft in accordance with the foregoing object wherein the pitch of the wing systems is variable.

It is another object of the invention to provide an aircraft in accordance with the foregoing objects wherein a multiple part tail assembly provides the means for directing the motion of the aircraft.

It is another object of the invention to provide an aircraft which can take off from the ground with the fuselage positioned vertically and which can subsequently level off into flight position with the fuselage approximately horizontal to the ground.

It is another object of the invention to provide an aircraft with a pair of oppositely rotating propulsion devices which are arranged upon a common axis which is substantially parallel with the fuselage of the aircraft and wherein the fuselage is adapted to be positioned vertically for take off and is subsequently directed into a generally horizontal flight position, the propulsion devices providing the power for vertical take off as well as forward motion of the aircraft when in horizontal flight position and for sustaining the aircraft in the air.

It is another object of the invention to provide an aircraft having a pair of oppositely rotating propulsion devices providing the sole means for causing forward motion of the aircraft and for sustaining the same in the air.

It is another object of the invention to provide an aircraft in accordance with the foregoing object wherein the pitch of the propulsion devices is variable to alter the same in a manner to produce a slow screw for take off of the aircraft and to provide a fast screw for moving the aircraft in the air.

It is another object of the invention to provide an aircraft in accordance with any of the foregoing objects wherein the propulsion devices are wing systems having angle of pitch which increases from the fuselage outwardly to the tip thereof.

It is another object of the invention to provide an aircraft in accordance with any of the foregoing objects wherein a multiple part tail assembly provides the sole means for directing the motion of the aircraft.

It is another object of the invention to provide an aircraft having a pair of oppositely rotating propulsion devices which are arranged axially with respect to the fuselage of the aircraft for propelling the same through the air and for providing sustaining force when the craft is flown at a slight angle of attack, which aircraft can also be landed in a vertical direction in a manner whereby the axially arranged propulsion devices provide the lifting force to slowly settle the aircraft to the ground in a vertical direction.

It is another object of the invention to provide an aircraft in accordance with any of the foregoing objects wherein the length, or span, of the propulsion devices or the parts of the tail assembly are variable in surface area or in length.

Further objects and advantages will become apparent from the drawings and the following description.

In the drawings:

Figure 1 is an elevational view of the aircraft in horizontal position.

Figure 2 is an elevational view of the aircraft in take off or landing position.

Figure 3 is an elevational view looking toward the front end of the aircraft when in horizontal position.

Figure 4 is a schematic view showing the position of the propulsion devices or wing systems to permit starting of the engine and idling thereof while the aircraft is on the ground.

Figure 5 is a schematic view of the position of the propulsion devices for lifting the aircraft from the ground.

Figure 6 is a schematic view of the aircraft showing the position of the propulsion device or wing systems when moving the aircraft through the air and simultaneously supporting the same.

Figure 7 is a schematic view of the aircraft showing the position of the propulsion devices when the engine has stalled and the craft has been brought into vertical position to slowly settle the same to the ground and thereby prevent a crash landing.

Figure 8 is an elevational view looking toward the end of one of the propulsion devices or wing systems showing the variance in angle of pitch thereof from the fuselage of the aircraft toward the tip end.

Figure 9 is a schematic view showing the position of the multiple tail surfaces when maneuvering the craft in a vertical direction.

Figure 10 is a schematic view of the position of the multiple tail surfaces when maneuvering the craft in a horizontal direction.

Figure 11 is a schematic view of the position of the multiple tail surfaces when rotating the body of the aircraft about its own axis.

In this invention the aircraft consists of a fuselage 10 of streamlined design to reduce resistance to wind pressure to the maximum degree. A hood 11 encloses the cockpit in conventional manner. The aircraft in this invention is unconventional in that the usual wing is completely omitted. To provide support for the aircraft while in the air and to raise the aircraft into the air from the ground a pair of screws or propulsion devices 12 and 13 are provided. These propulsion devices also provide lifting force for the aircraft to sustain the same in the air when the craft is flown at an angle of attack. These devices will be hereinafter more fully described. In order to direct the plane in its motion through the air a multiple part tail assembly is carried upon the fuselage and consists of three or more fins 14, 15 and 16. These fins are mounted upon the fuselage in a manner to permit them to be rotated about an axis which extends radially from the fuselage 10 so that the fin 16 acts in the manner of a rudder while the fins 14 and 15 act in the manner of an elevator. The tail assembly comprising the three fins 14, 15 and 16 provides the sole means for directing the motion of the aircraft in the air.

When the aircraft is in horizontal flight the fuselage 10 is carried in a generally horizontal position but at a slight angle of attack so that the flight position of the craft is conventional and the fuselage thereof can be streamlined to the same extent as is conventional with the present day aircraft.

When the aircraft is to take off or land the fuselage 10 is arranged in a vertical position as indicated in Figure 2 so that the axis of the fuselage is vertical while the propulsion devices or wing systems 13 are arranged horizontally with respect to the ground. In order to support the craft upon the ground a retractable landing apparatus is provided which consists of a tripod landing device consisting of the supporting legs 17 which are suitably pivoted at their upper ends to the fuselage 10 of the aircraft, and are provided with supporting brackets 18 which also provide the means for retracting the tripod arms 17 into streamlined conformity with the fuselage 10 after the aircraft is in flight.

The wing systems 12 and 13, which also provide the propulsion devices for the aircraft, are suitably mounted upon the aircraft for rotation upon an axis which is substantially parallel with the axis of the fuselage 10. The wing systems 12 and 13 extend radially from the fuselage 10 regardless of whether the fuselage is in a vertical or horizontal position. The wing systems 12 and 13 are carried upon suitable rotating members 19 and 20 respectively. These members 19 and 20 are suitably geared to a power plant mounted within the aircraft and provide rotating bands which completely encircle the fuselage 10 and form a part thereof. The rotating bands 19 and 20 preferably are arranged in the surface of the fuselage to provide a streamlines contour to the fuselage 10. The wing systems 12 and 13 are suitably secured to the rotating bands 19 and 20 and are so geared to the power plant that they are driven in opposite rotative directions. By providing oppositely rotating propulsion devices 12 and 13 the torque effect of a single propulsion device upon the fuselage 10 of the aircraft is eliminated and, as will be hereinafter more fully set forth, also aids in supporting the aircraft while in flight.

Since the devices 12 and 13 provide both propulsion power for the aircraft and the means for supporting the craft in the air the term propulsion device is synonymous with wing system and since the propulsion devices 12 and 13 act in the same manner as the propeller of the conventional aircraft they can also be referred to as air screws. Since the propulsion devices 12 and 13 perform all of the necessary functions of moving the aircraft and supporting the same the various terminology resorted to will indicate the function of the devices 12 and 13 according to the particular usage of the devices being described so that when the term "air screw" is used the devices are acting as propellers and when the term "wing system" is used the devices are acting in the manner of wings for supporting the aircraft.

The wing systems 12 and 13 are provided with a greater pitch toward the ends or tips thereof as indicated in Figure 8. The portions of the wing systems 12 and 13 immediately adjacent the fuselage 10 more nearly approximate the shape of an airfoil and the position thereof with respect the fuselage. The wing systems 12 and 13 perform the double function of supporting the aircraft and of providing means for propelling the aircraft through the air. Further, the wing systems 12 and 13 are rotatable about an axis which extends radially from their axes of rotation so that the pitch of the entire wing system can be varied in the manner of a variable pitch propeller in order to change the power obtained therefrom. Any suitable mechanism can be provided for varying the pitch of the wing system and suitable controls for regulating the pitch can be provided as is conventional with variable pitch propellers.

The wing systems 12 and 13, as previously mentioned, rotate in opposite directions and therefore the pitch of the wing systems is reverse with respect each other in order to provide air screws, both of which will propel the craft through the air. It can readily be seen that in either Figure 5 or 6 that if the direction of rotation of the wing systems 12 and 13 are as indicated by the arrows adjacent thereto that the pitch provided to the wing systems will cause the same to act as air screws, and since the broad side or face of the wing systems provides planes angular with respect the plane of rotation of the air screws 12 and 13 that a lifting force will be provided when the air screws or wing systems are located in any position except vertical. The maximum lift of the wing systems 12 and 13 will of course occur when the wing systems are in a horizontal plane so that at that time a positive lift is provided by each of the wing systems.

It is of course to be understood that the schematic representations in Figures 4, 5, 6 and 7 are purely diagrammatic to show the relation of the wing systems with respect each other. The showings of Figures 4, 5, 6 and 7 should not be misconstrued as representing a pair of oppositely rotating wing systems which are in substantial parallel alignment. Such alignment will occur only when the wing systems are approximately 45° from the vertical or horizontal with respect the fuselage 10.

The center of the lift of the wing systems 12 and 13 is positioned slightly in advance of the center of gravity of the aircraft. This lifting force is offset by a slight positive lift provided by the camber of the tail surfaces 14 and 15. The tail surface 16 can act purely as a rudder. In order to provide greater power for lifting the aircraft from the ground the wing systems 12 and 13 are provided with extensible tips 21. The extensible tips are shown only on the wing system 12. However, it is to be understood that a similar extensible tip is provided on the wing system 13. The tail surfaces 14, 15 and 16 are also provided with extensible tips, the tip 22 for the tail portion 15 and the tip 23 for the tail portion 14 being shown in Figure 2. A similar extensible tip is provided for the tail portion 16. The increase of surface area provided by the extensible tips on the wing systems 12 and 13 and on the tail portions 14, 15 and 16 provide greater stability to the craft when rising from the ground and particularly the extensible tips of the wing systems 12 and 13 provide greater power for lifting the craft. After the aircraft has gained altitude and has increased its forward speed due to the action of the air screws 12 and 13 the extensible tips 21, 22 and 23 as well as the tips on the air screws 13 and the tail portion 16 can be retracted whereby the drag is reduced to gain higher forward speed.

In order to understand the operation of the aircraft a normal flight routine will be set forth. Reference is made in this description of the flight routine to Figures 4 to 11 inclusive wherein the position of the wing systems and tail surfaces are disclosed with respect one another.

In the take off position the fuselage 10 of the aircraft is arranged in a vertical position as disclosed in Figure 2. In this position the air screws or wing systems 12 and 13 are horizontally arranged with respect the ground so that when they are rotated a vertical lifting force will be imparted to the fuselage 10 thereby lifting it from the ground in a straight vertical direction. When the engine of the aircraft is first started the wing systems 12 and 13 will be arranged with a zero pitch as disclosed in Figure 4, the air screw 13 turning in a rightward direction while the air screw 12 turns in a leftward direction. The air screws remain in this position during the warm- up period for the engine so that the aircraft has no tendency to rise from the ground since at this time the air screws 12 and 13 have no pitch. When it is desired to take off in the aircraft the air screws 12 and 13 are rotated about their radial axes to increase the pitch whereby the oppositely rotating propelling devices 12 and 13 will operate as air screws to lift the aircraft from the ground. This position of the air screws 12 and 13 is indicated in Figure 5 and is indicated as being a maximum of about a 30° pitch from the horizontal.

As the aircraft gains altitude the pilot will alter the vertical climb to bring the aircraft into a horizontal flight position. In order to change the direction of flight from vertical to horizontal the tail portions 14 and 15 are rotated about their radial axes to tilt the trailing edge downwardly so that the portions 14 and 15 now act as elevators and the force of air directed against the under surface of the tail portions will force the tail upwardly and therefore level off the fuselage 10 of the aircraft into horizontal flight condition. During the time the craft is changing its flight position from vertical to horizontal the pitch of the wing systems 12 and 13 is increased to approximately 70° from the original horizontal position of the wing systems.

This position of the wing systems 12 and 13 thereby positions the same with regard to the fuselage 10 so that when the wing systems are rotating in any plane except true vertical a certain lifting force will be created by the wing system. The normal flight position of the wing systems or air screws 12 and 13 relative to the fuselage is thus indicated in Figure 6 while the aircraft, during horizontal flight, flies at a slight angle of attack, depending upon its horizontal speed. That is, the front of the fuselage is tilted upwardly so that its axis will be positioned angularly with respect to a true horizontal plane so that the air screws will be rotating in a plane other than a true vertical plane. The angle of attack of course will vary with the horizontal speed of the craft.

As previously stated the wing systems 12 and 13 are rotatable about their radial axes and therefore the speed of the aircraft can be controlled within limits by alteration of the pitch of the wing systems 12 and 13 and therefore increase or decrease their effectiveness as air screws in the same manner as is conventional with variable pitch propellers.

It has already been shown that depression of the trailing portions of the tail elements 14 and 15 causes the tail to level the aircraft to flight position after gaining altitude. This position of the tail members 14 and 15 is indicated in Figure 9 whereby the face portions 14a and 15a are exposed. The tail element 16 remains parallel with the axis of the fuselage and acts as a rudder to direct the straight forward motion of the aircraft. This same movement of the tail members 14 and 15 which levels the aircraft into flight position will also cause the aircraft to be moved into a diving position.

In order to maneuver the craft to the left or to the right in a horizontal plane the tail member 16 is rotated on its radial axis and as indicated in Figure 10 has been moved in a leftward direction exposing the face 16a. Air movement upon the face 16a will drive the tail in a rightward direction thereby altering the horizontal course of the aircraft toward the left. To eliminate any tendency of the tail portion 16 to rotate the fuselage 10, the tail portions 14 and 15 are rotated in a direction opposite to the direction of rotation of the tail member 16 but to a lesser degree, thereby exposing the faces 14a and 15b which offset the torsional effect of the tail surfaces 16a. It is understood of course that the tail members are suitably interconnected by control elements which move the tail members 14 and 15 in their proper proportionate movement when moving the tail portion 16 to produce a leftward or rightward movement in a horizontal plane.

In order to obtain a banking or a rolling action of the aircraft the tail members 14, 15 and 16 are all rotated on their rotational axes in the same direction thereby exposing the faces 16a, 14b and 15a. This arrangement of the tail members causes the fuselage 10 to rotate upon its own axis thereby producing a rolling motion. It is of course understood that the tail elements 14, 15 and 16 are interconnected by suitable control mechanism whereby any combination of movements of control surfaces are obtainable to produce various combinations of pitching, rolling and yawing of the aircraft.

When landing the aircraft the speed of the engine is maintained but the pitch of the wing systems is reduced to lose altitude and flying speed. When approaching the landing field the nose of the aircraft is directed upwardly to bring the fuselage of the aircraft into a vertical position. Simultaneous with such movement the pitch of the air screws or wing systems is reduced to approximately 5° with respect the horizontal so that the aircraft will then hover in a vertical position, the speed of the engine being controlled to obtain proper speed of the air screws 12 and 13 and thereby hover the craft above the ground. The speed of the engine is then slightly reduced or the pitch of the air screws again reduced slightly to permit the aircraft to move downwardly by the force of gravity until it rests upon the tripod landing gear which has been suitably extended for the landing operation. It is of course understood that the extensible tips on the wing systems or propulsion devices and on the tail members are preferably extended during this landing motion to provide increased stability to the aircraft.

The aircraft of this invention, while capable of horizontal flight with the fuselage in a generally horizontal position, is also capable of being brought to a safe landing in the event the engine is stalled. In the event the engine of the aircraft stalls for any reason the tail assembly is manipulated to bring the craft in a position that the fuselage stands vertical. The pitch of the air screws 12 and 13 is then changed to a negative pitch so that when the force of gravity causes the craft to move downwardly the wind striking the air screws 12 and 13 will cause the same to rotate in the same direction as they had previously been rotating under power of the engine of the aircraft. Since the air screws 12 and 13 present relatively large surface areas to the air as the craft is moving downwardly in a vertical direction considerable resistance will be presented by the air screws and thus retard the fall of the aircraft. As the craft approaches the ground the momentum imparted to the air screws is used to prevent a crash landing by suddenly changing the pitch of the screws from a negative pitch to a positive pitch. This sudden change in pitch of the air screws will retard the downward fall of the aircraft sufficiently to prevent a crash landing. The position of the air screws 12 and 13 while the craft is moving downwardly in a stalled condition is indicated in Figure 7. It can readily be appreciated from the position of the air screws 12 and 13 that they will continue to rotate in the same direction as if driven by the engine and that if they are suddenly given a positive pitch that they will tend to cause the aircraft to rise and thus retard the fall thereof.

Having thus fully described my invention, what I claim as new and desire to secure by Letters Patent is:

1. A heavier than air craft having an elongated fuselage that is adapted to be sustained in flight with the axis thereof arranged vertically or substantially horizontally, a pair of oppositely rotatable wing systems with their axes of rotation arranged substantially coaxial with said axis of said fuselage and forming the principal means of sustaining and propelling said craft in flight, each of said wing systems comprising a plurality of blades, all of the blades of said wing systems being of substantially the same size and form and being variable in pitch, one of said wing systems being mounted adjacent the front of said fuselage and the other of said wing systems being spaced rearwardly therefrom a substantial distance, said wing systems and the load of the craft being disposed and arranged so that the center of gravity of said craft is located between said wing systems, and adjustable tail means at the rear of said fuselage for directing the flight of the craft.

2. A heavier than air craft having an elongated fuselage that is adapted to be sustained in flight with the axis thereof arranged vertically or substantially horizontally, a pair of oppositely rotatable wing systems with their axes of rotation arranged substantially coaxial with said axis of said fuselage and forming the principal means of sustaining and propelling said craft in flight, each of said wing systems comprising a plurality of blades all of the blades of said wing systems being of substantially the same size and form and being variable in pitch, said wing systems being adapted to be driven with the pitch thereof set so that the torque reaction of one of said wing systems on the fuselage substantially balances the torque reaction of the other of said wing systems on the fuselage, one of said wing systems being mounted adjacent the front of said fuselage and the other of said wing systems being spaced rearwardly therefrom a substantial distance, said wing systems and the load of the craft being disposed and arranged so that the center of gravity of said craft is located between said wing systems, and adjustable tail means at the rear of said fuselage for directing the flight of the craft.

3. A heavier than air craft having an elongated fuselage that is adapted to be sustained in flight with the axis thereof arranged vertically or substantially horizontally, a pair of oppositely rotatable wing systems with their axes of rotation arranged substantially coaxial with said axis of said fuselage and forming the principal means of sustaining and propelling said craft in flight, each of said wing systems comprising a plurality of blades, all of the blades of said wing systems being of substantially the same size and form and being variable in pitch to produce a slow screw for vertical take-off and a fast screw for horizontal flight, one of said wing systems being mounted adjacent the front of said fuselage and the other of said wing systems being spaced rearwardly therefrom a substantial distance, the said wing systems and the load of the craft being disposed and arranged so that the center of gravity of said craft is located between said wing systems, and adjustable tail means at the rear of said fuselage for directing the flight of the craft.

4. A heavier than air craft having an elongated fuselage that is adapted to be sustained in flight with the axis thereof arranged vertically or substantially horizontally, a pair of oppositely rotatable wing systems with their axes of rotation arranged substantially coaxial with said axis of said fuselage and forming the principal means of sustaining and propelling said craft in flight, each of said wing systems comprising a plurality of blades, all of the blades of said wing systems being of substantially the same size and form and being variable in pitch, one of said wing systems being mounted adjacent the front of said fuselage and the other of said wing systems being spaced rearwardly from the front end of the fuselage a distance equal to at least one-third the length of the fuselage, said wing systems and the load of the craft being disposed and arranged so that the center of gravity of said craft is located between said wing systems, and adjustable tail means at the rear of said fuselage for directing the flight of the craft.

5. A heavier than air craft having an elongated fuselage that is is adapted to be sustained in flight with the axis thereof arranged vertically or substantially horizontally, a pair of oppositely rotatable wing systems with their axes of rotation arranged substantially coaxial with said axis of said fuselage and forming the principal means of sustaining and propelling said craft in flight, each of said wing systems comprising a plurality of blades, all of the blades of said wing systems being of substantially the same size and form and being variable in pitch, the blades of each of said wing systems having an angle of pitch which increases from the fuselage outwardly toward the tip thereof, one of said wing systems being mounted adjacent the front of said fuselage and the other of said wing systems being spaced rearwardly therefrom a substantial distance, said wing systems and the load of the craft being disposed and arranged so that the center of gravity of said craft is located between said wing systems, and adjustable tail means at the rear of said fuselage for directing the flight of the craft.

6. A heavier than air craft having an elongated fuselage that is adapted to be sustained in flight with the axis thereof arranged vertically or substantially horizontally, a pair of oppositely rotatable power driven axially spaced bands having their axes of rotation arranged substantially coaxial with said axis of the fuselage and rotatable relative thereto, the outer periphery of said bands being substantially flush with said fuselage one of said bands encircling said fuselage a substantial distance rearwardly of the front thereof, each of said bands providing a mounting for a wing system, each of said wing systems comprising a plurality of blades, all of the blades of said wing systems being of substantially the same size and form and being variable in pitch and forming the principal means of sustaining and propelling the craft in flight, of said wing systems and the load of the craft being disposed and arranged so that the center of gravity of said craft is located between said bands, and adjustable tail means at the rear of said fuselage for directing the flight of the craft.

WILEY K. CROWDER.